United States Patent [19]
Nguyen et al.

[11] Patent Number: 5,459,845
[45] Date of Patent: Oct. 17, 1995

[54] INSTRUCTION PIPELINE SEQUENCER IN WHICH STATE INFORMATION OF AN INSTRUCTION TRAVELS THROUGH PIPE STAGES UNTIL THE INSTRUCTION EXECUTION IS COMPLETED

[75] Inventors: Truong Nguyen, Beaverton, Oreg.; Frank S. Smith, Chandler, Ariz.

[73] Assignee: Intel Corporation, Santa Clara, Calif.

[21] Appl. No.: 336,326

[22] Filed: Nov. 8, 1994

Related U.S. Application Data

[63] Continuation of Ser. No. 141,585, Oct. 27, 1993, abandoned, which is a continuation of Ser. No. 630,535, Dec. 20, 1990, abandoned.

[51] Int. Cl.[6] .................................................. G06F 9/22
[52] U.S. Cl. ........................ 395/375; 364/DIG. 1; 364/DIG. 2; 364/231.8
[58] Field of Search ............... 364/DIG. 1 MS File, 364/DIG. 2 MS File; 395/400, 425, 375, 800

[56] References Cited

U.S. PATENT DOCUMENTS

| | | | |
|---|---|---|---|
| 4,161,026 | 7/1979 | Wilhite | 395/775 |
| 4,399,507 | 8/1983 | Cosgrove et al. | 395/375 |
| 4,407,015 | 10/1983 | Ziobro | 364/200 |
| 4,430,707 | 2/1984 | Kim | 364/200 |
| 4,498,136 | 2/1985 | Sproul, III | 364/200 |
| 4,847,755 | 7/1989 | Morrison et al. | 395/375 |
| 4,891,753 | 1/1990 | Budde et al. | 364/247 |
| 4,903,196 | 2/1990 | Pomerene et al. | 364/247 |
| 5,119,483 | 6/1992 | Madden et al. | 395/375 |
| 5,150,468 | 10/1992 | Staplin et al. | 395/375 |
| 5,193,205 | 3/1993 | Matuo et al. | 395/800 |

Primary Examiner—Robert B. Harrell
Attorney, Agent, or Firm—Owen L. Lamb

[57] ABSTRACT

A microprocessor comprised of Instruction Fetch Unit (10), Instruction Decoder (12), Pipeline Sequencer (14), Register File (16), Multiply/Divider-Unit, Execution Unit, and REG coprocessors block (18) and instruction cache, Address Generation Unit, local register cache, and MEM coprocessors block (20). The Instruction Cache provides the Instruction fetch unit (10) with instructions every cycle. The instruction sequencer (IS) includes the Fetch Unit (IFU-10), the Instruction Decoder (ID-12) and the Pipeline Sequencer (PS-14). The instruction sequencer can decode and issue up to three instructions per clock. The pipe sequencer (14) employs a write back path to store snap shots of the state of the machine in pipe stages 1 and 2. This provides the way for branch guessing and the process switching to correct itself after issuing a wrong IP (in the case of the branch guessing), or a way to preserve the internal state of the machine at the time a context switching occurs in order to come back to the same condition it had left.

9 Claims, 11 Drawing Sheets

| | PHASE | | | | | |
|---|---|---|---|---|---|---|
| | 1 | 2 | 1 | 2 | 1 | 2 |
| MACH BUS | CMPA | | CMPB | | NOP | |
| ALU SOURCES<br>ALU USES | | SRC_OF_A<br>CCC_OLD | | SRC_OF_B<br>CCC_OF_A | | CCC_OF_B |
| CCBYPASS | OFF | | ON | | ON | |
| CCIDEUQ12 | | CCC_OLD | | CCC_OLD | | CCC_OF_A |
| CCEUIDQ22 | | | | CCC_OF_A | | CCC_OF_B |
| BRANCH FLAG VALUE | | CCC_OLD | | CCC_OF_A | | CCC_OF_B |

T

| TIME → | 31.00 | 31.50 | 32.00 | 32.50 | 33.00 | 33.50 |
|---|---|---|---|---|---|---|
| PH1 | | | | | | |
| UA | 80 | 800 | 800 | 804 | 804 | 900 |
| USTATEQ01 | F8 | C0 | C0 | E0 | E0 | C0 |
| SCBOKQ12 | 1 | 1 | 0 | 1 | 1 | 1 |
| NXTBOPQ11 | 0 | 1 | 1 | 1 | 1 | 1 |
| BRANCH REG (MAC) | N/A | 234 | 234 | 234 | 234 | 234 |
| BRANCH REG (MIC) | DON'T CARE | | | | | 900 |
| | 34.00 | 34.50 | 35.00 | 35.50 | 36.00 | 36.50 |
| PH1 | | | | | | |
| UA | 900 | 80 | 80 | 234 | 234 | 88 |
| USTATEQ01 | C0 | F8 | F8 | D8 | D8 | F8 |
| SCBOKQ12 | 1 | 1 | 1 | 1 | 1 | 1 |
| NXTBOPQ11 | 1 | 0 | 0 | 1 | 1 | 0 |
| BRANCH REG (MAC) | 234 | 234 | 234 | 234 | 234 | 500 |
| BRANCH REG (MIC) | DON'T CARE | | | | | |

FIG.5

| UADDDR | A | B | E |
|---|---|---|---|
| SELECT UADDR | | | SELECT E |
| NXTADR (Q02) | | CALCULATE D | |
| BRADR (Q12) | | CALCULATE E | |
| CURADR (Q11) | | | SELECT E |
| ALTADR (Q11) | | | |
| MACH BUS (Q11) | | | SUB |

FIG.6

| INSTRUCTION TYPE | WRITEBACK PATHS | | BRANCH GUESS SIGNAL | | | |
|---|---|---|---|---|---|---|
| BRCOMQ11 | CURRENT | ALTERNANTE | OPCODE | OLDFLGQ11 | UA STACK | EVENT REG |
| CBR(000) | NXTADDR<br>BRADDR | BRADDR<br>NXTADDR | BRADDR<br>BRADDR | DEASSERT<br>ASSERT | | C<br>U<br>R<br>R<br>E<br>N<br>T |
| CRET(001) | NXTADDR<br>RETADDR | RETADDR<br>NXTADDR | BRADDR<br>BRADDR | DEASSERT<br>ASSERT | | |
| CCAL(010) | NXTADDR<br>BRADDR | BRADDR<br>NXTADDR | BRADDR<br>BRADDR | DEASSERT<br>ASSERT | CURRENT<br>ALT | |
| DELAYED BRANCH (011) | NXTADDR<br>BRADDR | CNSTBUS | BRADDR<br>BRADDR | DEASSERT<br>ASSERT | | |
| MACRO-FLOW (100) | NXTADDR<br>BRADDR | BRADDR<br>NXTADDR | OPCADR | DEASSERT<br>ASSERT | CURRENT | OPCODE |
| PUSHIP (010) | NXTADDR<br>BRADDR | CNSTBUS | NXTADDR | DEASSERT<br>ASSERT | ALTER | C<br>U<br>R<br>R<br>N<br>T |
| COND CALL FLOW (110) | NXTADDR<br>OPCADDR | OPCADDR<br>NXTADDR | OPCADR | DEASSERT<br>ASSERT | CURRENT<br>ALTER | OPCODE |
| POPIP (111) | NXTADDR<br>BRADDR | BRADDR<br>NXTADDR | BRADDR | DEASSERT<br>ASSERT | | C<br>U<br>R<br>R |

FIG. 9

INSTRUCTION PIPELINE SEQUENCER IN WHICH STATE INFORMATION OF AN INSTRUCTION TRAVELS THROUGH PIPE STAGES UNTIL THE INSTRUCTION EXECUTION IS COMPLETED

CROSS REFERENCES TO RELATED APPLICATIONS

This application is a continuation of U.S. application 08/141,585 filed Oct. 27, 1993, now abandoned, which is a continuation of U.S. application 07/630,535, filed Dec. 20, 1990, now abandoned. U.S. Pat. No. 5,023,844, granted Jun. 11, 1991; U.S. Pat. No. 5,185,872, granted Feb. 9, 1993; U.S. Pat. No. 5,222,244, granted Jun. 22, 1993; U,S. Pat. No. 5,313,605, granted May 17, 1994; U.S. Statutory Invention Registration H1291, "A Microprocessor in Which Multiple Multicycle Operations Are Executed in One Clock Cycle by Providing Separate Machine Bus Access to a Register File for Different Types of Instructions" published Feb. 1, 1994; "Data Bypass Structure in a Register File on a Microprocessor Chip to Ensure Data Integrity", Ser. No. 07/488,254, filed Mar. 5, 1990, now abandoned; "An Instruction Decoder That Issues Multiple Instructions in Accordance with Interdependencies of the Instructions" Ser. No. 07/630,536, filed Dec. 20, 1990, now abandoned; "Instruction Fetch Unit in a Microprocessor That Executes Multiple Instructions in One Cycle and Switches Program Streams Every Cycle" Ser. No. 07/630,498 filed Dec. 20, 1990, now abandoned; "Branch Lookahead Adder" Ser. No. 07/686,479, filed Apr. 17, 1991, now abandoned; and, "Execution Interface Protocol" Ser. No. 07/630,496, filed Dec. 20, 1990, now abandoned; all assigned to Intel Corporation.

BACKGROUND OF THE INVENTION

1. Field of the Invention

The invention relates to data processing systems and more particularly to a method and apparatus for sequencing through multiple instructions utilizing a write-back path which can handle look-ahead prediction failures, direct memory access (DMA) switching and multiple path switching.

2. Description of the Related Art

The above referenced copending application Ser. No. 07/630,499, now U.S. Pat. No. H001291, describes a Reduced Instruction Set Computer (RISC) that is a superscaler pipelined microprocessor wherein multiple functions are performed during each pipeline stage, that is, multiple multicycle operations occur concurrently. The microprocessor includes a memory coprocessor connected to a MEM interface and a register coprocessor connected to a REG interface. The REG interface is connected to the first and second independent read ports and the first independent write port of a register file. The MEM interface is connected to the third and fourth independent read ports and a second independent write port of the register file. An Instruction Sequencer is connected to the REG interface and to the MEM interface.

An Instruction Cache supplies the instruction sequencer with at least three instruction words per clock. The Instruction Sequencer decodes incoming instruction words from the Cache, and issues up to three instructions on the REG interface, the MEM interface and/or the branch logic within the Instruction Sequencer. The instruction sequencer includes means for detecting dependencies between the instructions being issued to thereby prevent collisions between instructions.

A method of operation of a five pipe-stage pipelined microprocessor is taught. During the first pipe stage the Instruction Sequencer accesses said instruction cache and transfers from said I-Cache to said Instruction Sequencer three or four instruction words depending on whether the instruction pointer (IP) points to an even or odd word address.

During a second pipe stage, the Instruction Sequencer decodes instructions and checks, for dependencies between the issuing instructions. It then issues up to three instructions on the three execution portions of the machine, the REG interface, the MEM interface, and the branch logic within the Instruction Sequencer, only the instructions that can be executed. The sources for all the issued operations are read from the register file during the second pipe stage and, the sources for all the issued operations are sent out to the respective units to use.

During a third pipe stage, the results of doing the EU and/or the AGU ALU/LDA operations are returned to the register file which writes the results into the destination registers of the register file.

During the third pipe stage, the address is issued on the external address bus for loads and stores that go off-chip.

During a fourth pipe stage data is placed on the external data bus.

During a fifth pipe stage the bus controller returns the data to the register file.

It is an object of the present invention to provide an instruction sequencer that controls instruction execution by issuing Micro Addresses (UA)s each cycle, decides which instruction should be executed in the next cycle and handles Instruction pointer (IP) bookkeeping by gathering many boundary conditions from other units, makes guesses and then issues an instruction pointer in such a way that a preceding instruction will not see the change and the following instruction will, taking into account instruction pipelining, branch prediction and fail recovery, macro flow instruction lookahead, and other inter-dependent mechanisms.

SUMMARY OF THE INVENTION

The above object is accomplished in accordance with the invention by providing a pipelined microprocessor comprised of a first microinstruction address stack, and a number of pipe stages, in which pipelined microprocessor instructions pointed to by a microinstruction address are executed. State bits that make up all of the hidden states necessary to execute instructions pointed to by said microinstruction address of a first program are provided. A representation of said state information is maintained in each of said pipe stages and in said first microinstruction address stack. The state information is caused to travel through said the pipe stages until the instruction(s) are completed or until said state information finds its way onto the UA stack. New state information is substituted for said state information on said UA Stack when the instructions pointed to by the UA have completed.

In accordance with an aspect of the invention, a second microinstruction address stack is provided for storing state information of different programs running in foreground or background on multiple UA stacks to thereby allow a separate program sequence to run in the background while user code is running.

BRIEF DESCRIPTION OF THE DRAWINGS

The foregoing and other objects, features, and advantages of the invention will be apparent from the following more particular description of a preferred embodiment of the invention as illustrated in the accompanying drawings.

FIG. 5 is a timing diagram of basic timing for branch with scoreboard and interrupt;

FIG. 6 is a timing diagram the Pipe sequencer pipeline activity;

FIG. 9 shows the Write Back Path snap shot in q12 depending on 2 parameters: brcomq11 and oldflgq11;

DESCRIPTION OF THE PREFERRED EMBODIMENT

Figure 1:
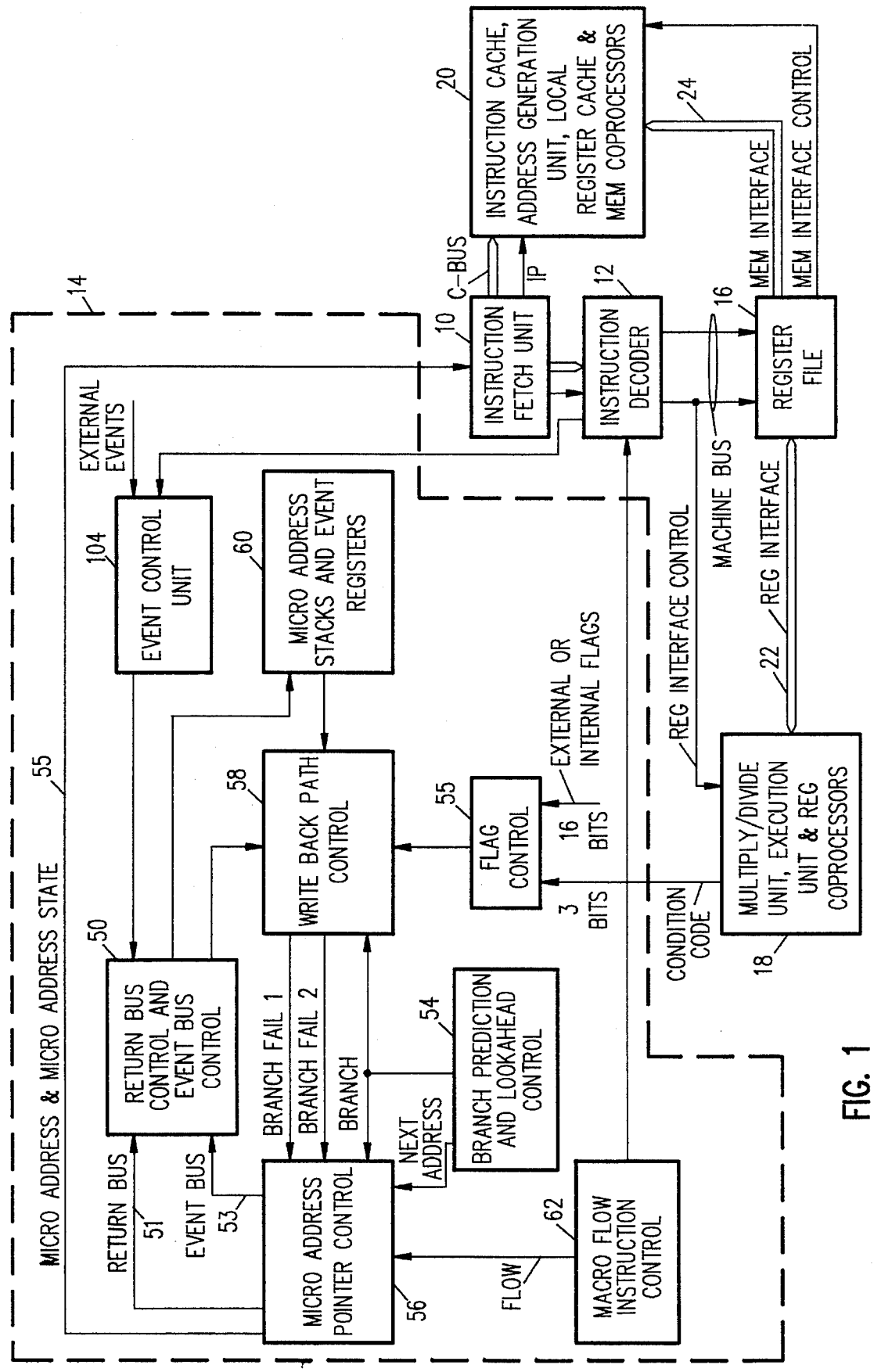
FIG. 1 is a functional block diagram of each of the major components of the microprocessor in which the invention is embodied.

As shown in FIG. 1, the microprocessor in which the present invention is embodied is comprised of Instruction Fetch Unit (10), Instruction Decoder (12), Pipeline Sequencer (14), shown within the broken lines, Register File (16), Multiply/Divide Unit, Execution Unit, and REG coprocessors block (18) and instruction cache, Address Generation Unit, local register cache, and MEM coprocessors block (20). These units are briefly described below. For more detailed information about each of these units refer to the above-identified copending applications. The Pipeline Sequencer (14) is the block in which the present invention is embodied and is shown in more detail in FIG. 2.

The Instruction Cache includes an Instruction ROM (I-Cache) and provides the Instruction fetch unit (10) with instructions every cycle over the cache bus (macro Bus). The I-Cache is four words wide and is capable of supplying four words per clock over the Macro bus.

The instruction sequencer (IS) includes the Fetch Unit (IFU-10), the Instruction Decoder (ID-12) and the Pipeline Sequencer (PS-14). This instruction sequencer decodes the incoming four instruction words from the 1-Cache. It can decode and issue up to three instructions per clock but it can never issue more than four instructions in two clocks. The instruction decoder (ID) and the pipeline sequencer (PS) are parts of the Instruction Sequencer. The IS decodes the instruction stream and drives the decoded instructions onto the machine bus which is the major control bus.

The Register File (RF-16) has 16 local and 16 global registers. The RF has 4 independent read ports and 2 independent write ports to support the machine parallelism.

Execution Unit and Multiply-Divide Unit block (18) performs all the simple integer and ordinal operations and integer/ordinal multiply, divide, remainder, and modulo operations of the microprocessor in which the present invention is embodied.

The Address Generation Unit (AGU) and Local Register Cache (LRC) block (20) does the effective address calculations in parallel with the integer execution unit and maintains a stack of multiple 16-word local register sets.

The microprocessor in which the present invention is embodied has two very high performance interfaces, the REG interface (22) and MEM interface (24). The REG interface is where all the REG format instructions are executed. The REG interface has two 64-bit source buses and a 64-bit destination bus. One instruction per clock can be issued on the REG interface.

The MEM interface is where all MEM format instructions are executed. It also connects the system to the memory coprocessor (20). The AGU and LRC mentioned above are coprocessors on the MEM interface. The operations can be single or multi-cycle just as described above for the REG interface.

Throughout this specification state, machine cycles, and instructions are referred to as being the previous, current, or next. The view point is that of the Instruction Pointer in Pipe 0. For example, the previous instruction is the one leaving the instruction decoder (q11) on its way to the Execution Unit (18) or Memory Interface (20); the current instruction is the one being fetched out of the Cache or Microcode ROM (q02); and finally the next instruction is the one that will be fetched based on the next address decision made in the current state (pipe 0).

Instruction Pipeline Sequencer

The Pipe Sequencer (14) controls instruction execution by issuing Micro Addresses (UA)s each cycle. Two memory spaces are defined, main memory space and microcode memory space. In addition to the two memory spaces two modes of operation are defined: Micro and Macro mode. In Micro mode the system executes a superset of RISC instructions and has access to 32 scratch registers in addition to the user's global and local registers. In Macro mode the machine will execute only specific architecture compatible instructions and will generate opcode invalid faults on all others.

The Pipe Sequencer (PS) decides which instruction should be executed in the next cycle and handles Instruction pointer (IP) bookkeeping.

The pipe sequencer gathers many boundary conditions from other units, analyzes them carefully, makes guesses and then issues an IP. This IP can be wrong because of wrong guessing, so an elaborate scheme of machine state and pipeline manipulation is provided in the PS.

Machine State Bookkeeping

One of the major goals of the system design of the present invention is to keep precise machine state bookkeeping between machine instructions. This ensures instruction order independence and greatly aids testability and debug. If an instruction alters the state of the machine (global registers, flags, IP, etc.) then it must do so in such a way that the preceding instruction will not see the change and the following instruction will. Doing this correctly is complicated by instruction pipelining, branch prediction and fail recovery, macro flow instruction lookahead, and other interdependent mechanisms.

The system core state is defined as state which can be altered by instructions and exist across instruction boundaries. The Instruction Sequencer (IS) contains all of the user inaccessible state. The register file contains user accessible registers. The system Core hidden state consists of the following fields:

Instruction Pointer-This is a 30 bit word aligned address into the memory space or the internal microcode space.

Translation block pointer (XLTBLK)- indicates which of two alias registers to use when aliasing operands in the current instruction.

Translation ready (XLTRDY)- indicates that the macro flow lookahead logic has found and translated a macro flow instructions and the instruction can be executed in this state. (see Macro Flow Instruction Control)

Cancel Register Operation (CANREG)- When asserted, the register operation in the current state is cancelled. This prevents parallel register and memory execution when operand dependencies exist between them.

Macro mode (MAC)- if asserted, the instructions should be interpreted as compatible instructions. If not asserted, the instructions are interpreted as microcode RISC operations.

External memory (EXT)- If asserted, the instructions are fetched from external memory space. If not asserted, the instructions are fetched from internal Microcode ROM.

Operation mode field (BOPCOM)- This 3 bit field indicates what type of operation the pipe sequencer is ready to execute and the decoding for this field is as shown in TABLE I.

Cache mode field (CACHEN)- this 2 bit field indicates the cache mode of the Instruction Sequencer and the decoding is as shown in TABLE II.

TABLE I

| BOPCOM | DESCRIPTION |
|---|---|
| 000 | Reserved |
| 001 | Reserved |
| 100 | Return quick |
| 101 | Cdebug mode |
| 010 | wait mode |
| 011 | wair/boprdy |
| 110 | no action |
| 111 | boprdy |

The above state bits make up all of the hidden state necessary to execute the instructions pointed to by the UA. This state exists in each of the pipe stages and in the UA Stack. This information travels through the machine's pipe stages until the instruction are executed or until it finds its way onto the UA stack. While on the stack, the state remains dormant waiting to be executed.

TABLE II

| CACHEN | DESCRIPTION |
|---|---|
| 00 | Keep same mode |
| 01 | Disable cache |
| 10 | enable partition A |
| 11 | enable partition B |

Pipe Sequencer Subunits

The pipe sequencer (14) shown in FIG. 1 is made up of following logic blocks which work together to select the right instruction pointer (IP) during each machine cycle: Process control and flag control (50), Branch Instruction Prediction and Lookahead Control (54), Micro Address Pointer Control (56), Micro Address Write back path control (58), Micro Address Stack Pointer Control (60), and Macro Flow Instruction Control (62). Each of these blocks is described in detail in the following paragraphs with reference to FIG. 2.

Process Control

It is often advantageous to allow a separate program sequence to run in the background while user code is being executed. To support such activity, the pipe sequencer has multiple UA stacks which store the state information of different programs running in the foreground or background. The separate UA stacks corresponding to different program sequences or processes to allow the pipe sequencer to restart the machine on the same boundary conditions as existed at the time the program was suspended. Thus, for example, if the user code was scoreboarded when the digest memory access (DMA) code takes over the machine, the user code will restart as score-boarded when it retakes control of the IS again.

Flag Control

Machine Flags are machine state just like any register. In the PS, all the 19 user flags are treated similarly as far as the timing constraints. All user flags have to be a Q21 signal (i.e., set up in phase 1 of pipe 2). Due to its late arrival (in phase 2 of pipe 2, i.e. Q22), the condition code requires, in addition, a bypass circuit inside the PS.

Flag Map

The Micro engine can branch on 32 flags. Some flags are dedicated for special purposes. Flags 16 through 23 are a decode of the Condition Codes. Flags 8 through 11 are always asserted. Flag 31 is always not asserted. The remaining flags (19 in all) are user definable. A summary of Flag definitions is given in table III

TABLE III

| FLAG NUMBER | DESCRIPTION |
|---|---|
| 0–7 | User Definable |
| 8–11 | Always Asserted (unconditional Branching) |
| 12–15 | User Definable |
| 16–23 | Condition Code Decode (no,g,e,ge,l,e,le,o) |
| 24–30 | User Definable |
| 31 | Not Asserted (don't branch) |

Condition code

The condition code is modified in q22 or two cycles after the instruction which causes the modification is issued out from the Instruction Fetch Unit. A problem arises when a microflow instruction modifies the condition code inside its microcode. The branch lookahead mechanism guesses the next branch at the same time it translates the microflow and may or may not create a branch fail based on the condition code modified by the translated cycle. After that translate cycle any instruction in the microcode which modifies the condition code will not have any effect on the outcome of the branch. The easiest solution is to disable the branch lookahead when there is a condition code modified microflow instruction before a branch.

Other Flags

There are 19 user definable flags accessible in microcode instructions. The definition of a flag as opposed to a status bit is that a flag is something the micro engine can conditionally branch on. Since no instruction modifies these flags directly, these flags are modified by external sources. If instructions are added to modify these flags directly (like a MOVFLAG or MODFLAG instructions) then the instruction must be classified as a compare instruction in that it must assert MODFLG when the instruction is executed. This can be done by placing the instruction in the 0x5A or 0x7A opcode slot.

These flags are generated externally. It is up to the external logic to insure that the flags are valid each cycle.

If peripheral status bits are desired to be branch flags and they are located in Coprocessor registers, then these registers should have a special Mov_Coprocessor instruction in opcode slot 0x5A or 0x7A. Other non-flag bits can exist in these registers but sometimes the machine will be delayed by 1 or 2 clocks if the Mov_Coprocessor instruction is followed by a conditional branch.

There is no support to synchronize Branch flags mapped into Special Function Registers. Branch Flags can be placed here but they must not be accessible to the user because the machine will not work for all combinations of instructions.

Flag Timing

Condition codes have a special timing relationship with the rest of the machine. However, the timing for the other flags is user defined. Any flag that is modified by an instruction must follow the same basic timing pattern and have bypasses just as the condition codes have.

Figures 3, 4:
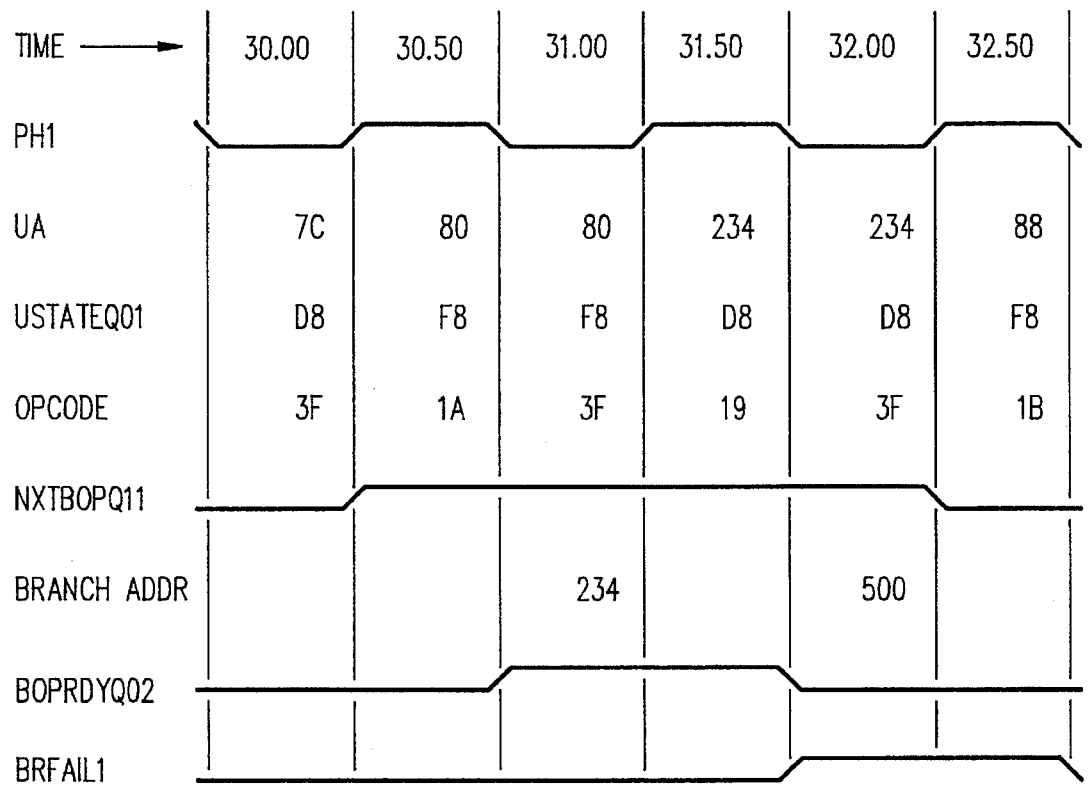
FIG. 3 is a timing diagram of the basic timing for condition codes.
FIG. 4 is a timing diagram of basic timing for unconditional branch.

FIG. 3 shows the basic timing for condition codes. The following instruction sequence pertains to FIG. 3:

| A | B | C |
|---|---|---|
| cmpa | cmpb | nop |

Notice that condition codes have the same basic timing as source and destination operands of register format instructions including the destination operand bypass. FIG. 3 also shows the Branch Flag value which indicates the latest value of the branch flag. When the pipe sequencer receives the updated condition codes from the ALU, called CCEUIDQ22, it will bypass the old condition codes, called CCIDEUQ12, to decide the conditional branching. Then it will update its CC registers (condition code registers) to the new CCEUIDQ22 value and send out to the EU, in the next cycle, the new CCIDEUQ12. Note the following about the pipelining timing. Take T (shown in FIG. 3) as a reference point. T is Q22 for instruction A, which means that all Q22 signals at T are the result of the execution of instruction A. So, in essence, CCEUIDQ22 is the outcome of the cmp instruction A. But the updated CC is used not by A but by B, the next instruction of A. Thus, CCIDEUQ12 is a signal for instruction B which uses results from instruction A (CCEUIDQ22). Now, at time T, CCIDEUQ12 is not ready to be used for instruction B, but CCEUIDQ22 is already available. Thus the bypassing mechanism is used here.

Any other application specific flag that gets modified by an instruction should follow the same timing as shown above. The flag sent to the IS branch control must be valid the same time as shown for the branch flag value line in FIG. 3. Also the bypass mechanism shown in FIG. 3 must be implemented to insure that all flags are updated and used properly. Since bypassing is not supported by the core for other flags the external hardware must do this.

Branch Instruction Control (Prediction and Lookahead)

The Micro Engine supports a transparent conditional branch mechanism using the CTRL format instructions. The basic conditional branch consists of a 22 bit word displacement, a 5 bit flag mask, a 2 bit branch command field and a branch prediction bit.

A branch instruction comes in 2 forms; an IP relative form which is the CTRL format instruction and a delayed branch form which is a MEM format instruction.

Branch State

The design is aimed to make all branch type instructions zero cycle in execution time. To accomplish that, Branch Type Instructions are looked ahead and all parameters needed for the branch are calculated in advance. Those parameters are called Branch State and becomes the state of the instruction preceding the branch. Consequently, the branch execution becomes transparent.

The branch state is as follows:

Branch Operation Ready (boprdy)- This bit, when asserted, indicates that a Branch Look ahead is done.

Branch Target Address- A 30 bit field calculated from IP+ Displacement or loaded directly from the instruction (branch_extended).

Branch Flag Selector (flgmux)- this 5 bit field selects 1 of 32 flags to be used to decide which path to take in conditional branches.

Branch Command (brcom)- This 2 bit field selects between uCall, uRet, or conditional Branch.

Branch Prediction Bit (brtaken)-If asserted, this bit indicates a branch is to be taken if the particular flag is not valid in time.

Branch Target Address Calculation

Each cycle the branch lookahead logic in q11 will select 1 of the 4 instruction words then extract a displacement from it. It will then in q12 add this displacement to the IP. The result will be ready by the beginning of the next q01 to be used as the branch address. The timing is such that a 1 clock lookahead is sufficient to hide this calculation from program execution.

Branch Detection

All branches other than quick returns and delayed branches (explained subsequently) are detected through the branch lookahead logic. The IFU, as described in application Ser. No. 07/630,498, now abandoned, can give out 4 instructions in phase 2 of pipe 0 to the pipe sequencer to be analyzed. This data, along with the predecoded information, provides the pipe sequencer with all the necessary information to generate NXTBOPQ11 in the next phase. NXTBOPQ11 becomes BOPRDY state bit of the next instruction.

The NXTBOP logic must be able to look at all 4 words coming from the cache in q02 and figure out what instructions will execute in the current state so that it can locate the set of next instructions and then decide if a branch will be taken after the next set of instructions. When this is figured out the NXTBOP bit can be used to define the BOPRDY bit for the next cycle state of the current instruction sequence.

NXTBOP will only be asserted if the next cycle will execute a branch. This does not mean the next cycle in time but the next cycle of the current instruction sequence which may not happen immediately but be delayed due to a process switch, DMA interrupt, or by a change in the program flow due to a branch as shown in the following example:

| Instruction Sequence: | 7C | cmpo | | |
|---|---|---|---|---|
| | 80 | addo | | |
| | 84 | te | (to 0x234) | # take if equal |
| | 88 | b | (to 0x500) | # branch |
| | ... | | | |
| | 234 | addc | | |
| | ... | | | |

In FIG. 4, Ustateq01 is the state of the machine in q01. The third bit corresponds to boprdyq01. When UA=0x7C cmpo is executed in the following q11 at the same time that nxtbopq11 is being asserted. The nxtbop lookahead logic has determined that a branch will be executed in the next cycle (it found the branch at 0x84). Since the next cycle in time also corresponds to the next cycle of the instruction sequence, ustateq01 goes from 0xD8 to 0xF8 which means boprdyq01 is asserted.

When UA=0x80, addo and te are executed. The branch lookahead at the same time looks for branches beyond UA=0x84 and finds one at 0x88. Nxtbopq11 is asserted again but ustateq01 is not changed because the instruction sequence corresponding to the nxtbopq11 signal is not the next cycle. The target of the branch at (0x84) is the next cycle (0x234). The nxtbopq11 information is not lost but is pushed onto the UA stack.

The 0x88 branch target address (0x500) is calculated but not used yet. If a branch fail occurs (if te guessed wrong) then the 0x88 branch target address (0x500) will be used and this is what happens in FIG. 4 in the last cycle when Brfail1 is asserted. The UA is changed to 0x88 and the ustateq01 has its boprdyq01 bit set. The cycle after UA=0x88 would be the target address 0x500.

In FIG. 5 the same example is used but this time with an Assist Ucode happening at cycle 31.50 and instruction 80 getting scoreboarded:

| Instruction Sequence: | 7C | cmpo | | |
|---|---|---|---|---|
| | 80 | addo | | |
| | 84 | te | (to 0x234) # take if equal | |
| | 88 | b | (to 0x500) # branch | |
| | ... | | | |
| | 234 | addc | | |
| Assist Ucode: | ... | | | |
| | 800 | addo | (internal ucode) | |
| | 804 | b | (to 900) (internal ucode) | |
| | ... | | | |
| | 900 | uret | (internal ucode) | |

There are two important points to consider with respect to the example of FIG. 5: The preservation of the state machine before and after the Assist and the distinction of the core resources in macro and micro coded instructions. Instruction 80 which got scoreboarded before the Assist will be reexecuted when the flow gets restored so as the branch state. Thus, a different set of resources are needed (in this case branch registers) between user coded instructions (macro type instruction) and micro coded instructions (Assist or micro-flow instruction).

A more detailed explanation of the branch lookahead mechanism can be found in U.S. patent application Ser. No. 07/868,479.

Quick Returns

It is often necessary to return from a micro flow after just 1 state. The machine cannot do 1 state conditional return because the flag mask cannot be decoded in time, but unconditional returns are possible. In addition, the return quick can be combined with other encodings of the IP control field of the MEMB format to generate DELAYED OR EXTENDED BRANCHES discussed later. Another feature of the quick return instruction is that the machine always executes the next instruction in parallel with the return. If the next instruction is a MEM format instruction, then it doesn't look for any further instruction. If the next instruction is a REG format one, it will wait for the next instruction to be valid hoping for a MEM format instruction. If this is the case, then the machine will execute these 2 instructions in parallel with the return. Because the machine executes the next instruction in parallel with the return quick instruction which is not a control format instruction, the next instruction better not be a branch or an undefined word (undefined word with all bits loaded with zeros is considered to be a branch) to prevent the parallel execution of the two branch type instructions.

Delayed Branches

Besides the conventional branches which use CTRL format instructions described previously, the core also has the so called DELAYED BRANCH instructions which use MEMB format micro instructions to force the Effective address of the instruction onto the Return bus (51) of the pipe sequencer using puship or newip/newuip encoding and then do a quick return to mux the Return bus (51) out to the Micro address lines (55).

The DELAYED BRANCH instructions are needed when a jump to an outside 24-bit boundary is required and because it's a MEMB format instruction. All of the MEMB complex addressing modes (indexing, scaling, etc.) can be used to calculate the target address. In addition, cache mode and micro, macro switches can be manipulated using this type of instruction.

An example of a delayed branch instruction is shown below:

Instruction sequence

A: lda IP_target [retq newip] mov g0, g0 lda 0xf, g

Instruction A pushes the IP_target address onto the microaddress (UA) stack of the pipe sequencer and executes the unconditional return in parallel with the mov, lda instructions. Consequently, the machine is now jumped to the IP_target instruction.

Micro Address Pointer Control

Instruction execution begins with the selection of a UA. This section describes where this address comes from and what controls the selection process.

Figure 2:
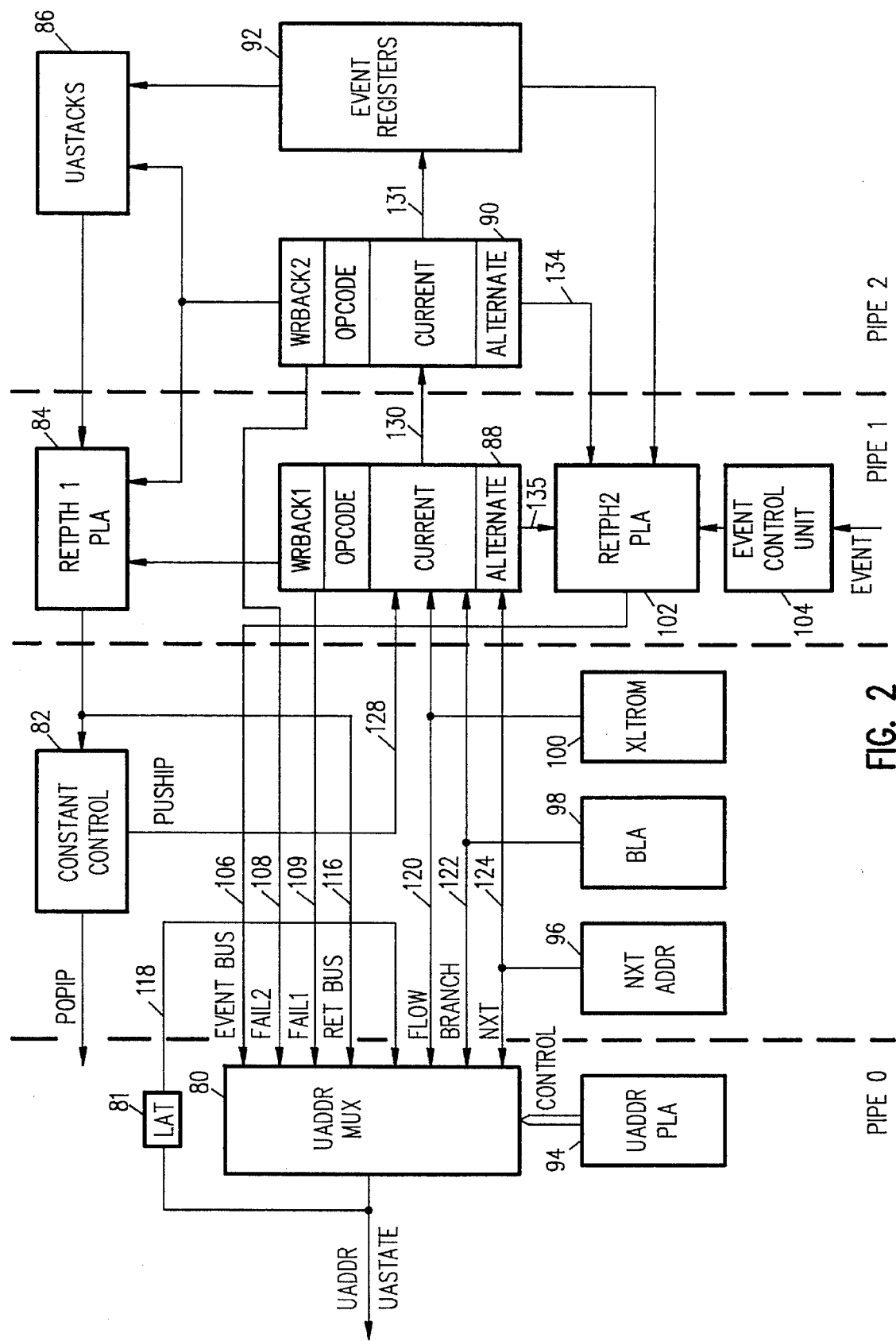
FIG. 2 is a more detailed block diagram of the pipe sequencer shown in FIG. 1.

FIG. 2 is a detailed functional diagram of the pipe sequencer (14) shown in FIG. 1. It includes the Micro Address (UA) Path, lines whose arrows point to the left in FIG. 2. and Write Back Path lines whose arrows point to the right in FIG. 2. The UA Path is the topic of the next section.

UA Selection

Consider the following instruction sequence:

| A | B | C | D | E |
|---|---|---|---|---|
| add | sub | be -> E | shl | and |

Figure 13:
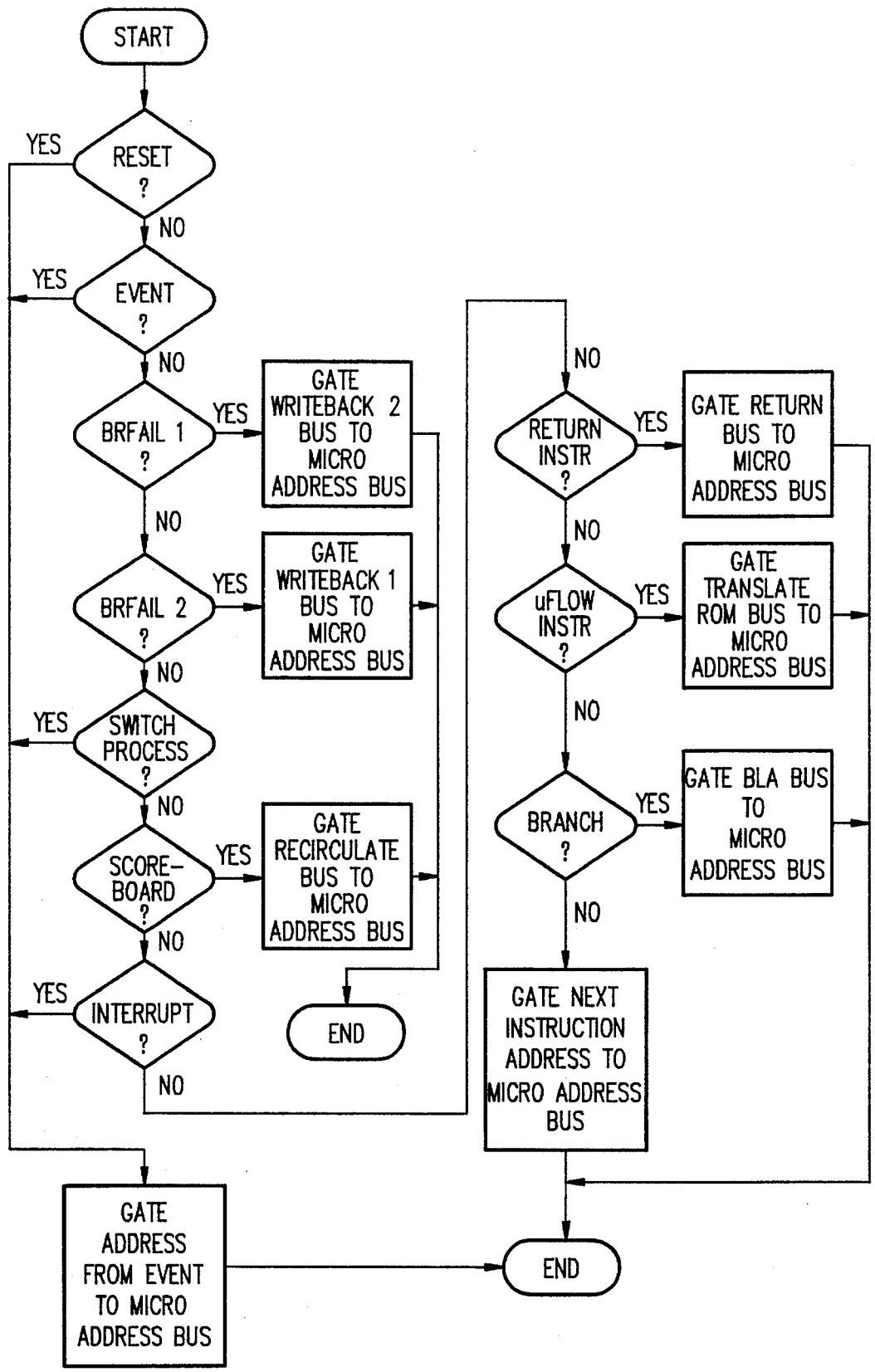
FIG. 13 is a flow chart of the pipe sequencer operation during pipe 0 which illustrates how the new instruction pointer is generated.

Refer to FIG. 6 and to FIG. 13 which is a flow chart of the pipe sequencer operation during pipe 0 which illustrates how the new instruction pointer is generated. The pipeline under column B of FIG. 6, in phase 2, the pipe sequencer has to look at the following information to decide what will be the next instruction to be issued in the next cycle.

Are we in RESET time?

Is there an Assist or any event which assert evalidqn2 now?

Is there a branch fail2?

Is there a branch fail 1?

Is there a request for a process switch or a restart of instruction A?

Does the machine get scoreboarded?

Do we have an interrupt pending?

Is B a return instruction?

Is B a micro-flow instruction?

Is B ready for a branch?

After analyzing boundary conditions mentioned above, the pipe sequencer chooses the following 8 sources of UA to send out to the Micro Address Bus.

Nxt address from the Next address incrementor

Branch target from the BLA

Opcode address from the Translate Rom

Return bus address

Event bus address

Write back2 from the pipe sequencer Write Back Path

Write back1 from the pipe sequencer Write Back Path

Recirculate address from the previous IP

Creation of the UA address

Next Address.

The next address must be generated (96) each clock so as to be used in the next cycle if instructions proceed sequentially. The number of words to be incremented can be different than 1 and is available only when the instruction stream is analyzed at the end of pipe 0. Thus, it is difficult if not impossible to generate the Next Address each clock if the logic must wait until q02 increments the 30 bit UA in order to create the new UA in the next phase (in Q01). To get around this problem a carry select incrementer is provided. In q01, when the new UA is available it is sent through the carry select incrementer and incremented by 16. The result is a next block address pointing always into the next quad boundary of the memory space. This output is also required by the instruction cache tag mechanism and is shipped to that logic as well as the Next Address generation logic. So then, by q02 the lower 2 bits of the next address need to be calculated and the proper upper 28 bits (either the old UA or the new Nxtadr) need to be selected. The lower 2 bits of the word address are created through combination logic. The inputs are the lower 2 bits of UA and the number of words currently being executed (0 to 4 words). There are 3 outputs, the 2 least significant bits of the Next Address and a carry signal to select the proper upper 28 bits for the carry select incrementer.

Branch Address.

The Branch Address comes from the branch lookahead adder (BLA-98) and is calculated by the lookahead circuit in Q12. This target address is from the CRTL format instruction only and is not applied for the Extended branch which is MEM format instruction.

Opcode Address.

Macro Flow instructions which take more than 1 cycle to complete must branch into the Micro ROM. The Opcxltq02 bus provides the branch target address for this purpose. The generation of Opcxltq02 and the Braddq02 is similar, in the sense that they both come from a lookahead mechanism and they are transient state. Opcxltq02 comes from Xrom in the ID (see Ser. No. 07/630,536, now abandoned), and the lookahead mechanism resides in the BLA (98).

Return bus Address

Referring to FIG. 6, at column B, phase 2, the pipe sequencer analyses pipe 1 and pipe 2 information to see if any call, return, event or process switching are present. Then, without looking at instruction B, it assumes that B is a uret instruction and selects the right source to put into the return bus. Thus, if B is not a return instruction, the data in the return bus can be discarded or is routed back to the Write Back Path for future use.

Figure 7:
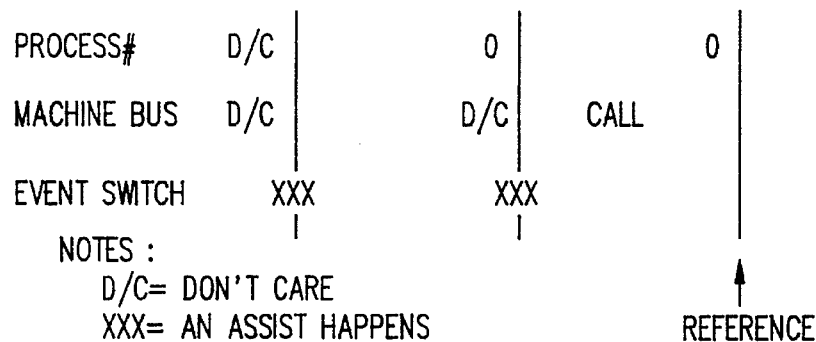
FIG. 7 is an example of the way the pipe sequencer determines the return IP.

An example of the way the pipe sequencer determines the return IP is shown in FIG. 7. At the reference point, the pipe sequencer has to come up with a return address which must be ready at the next phi to be selected by the UA address mux. The choice is the OPCODE TRANSLATE PATH of the Write Back which has the Branch target address of the call if that call is a micro call instruction or the Opcode address of the first micro instruction if that call is a macro-flow call instruction.

In this example, the process number and the instruction itself of pipe 2 does not affect the return address, but, if the call instruction is replaced with the return instruction, then the process switch and the pipe 2 instruction become essential in the selection of the return address.

To summarize, the pipe sequencer looks at instructions at both pipe 1 and 2 to determine if they are call or return type instructions, compares the process ID of the 2 pipes with the present one, sees if an Assist is required within those 2 pipe windows, then decides which of the following sources drives the return bus: UA stack, Current path 1, Current path 2, Opcode Path 1, Opcode path 2, Alternate path 1, Alternate path 2.

Event bus address

Figure 8:
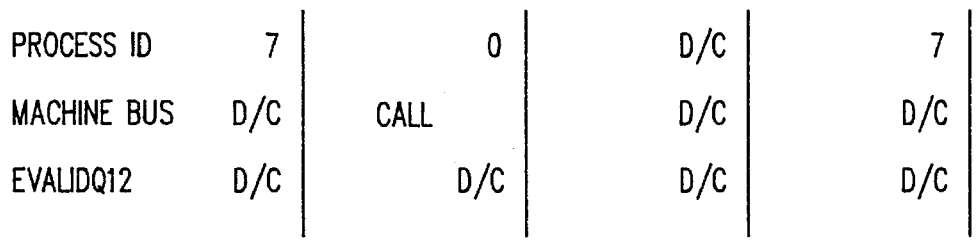
FIG. 8 illustrates the mechanism to generate the Event bus address.

Just as the Return Bus controller prepares information to put onto the return bus (51), the Event Bus controller (104) analyzes all necessary data from pipe 1 and 2 to determine which IP it should put into the event bus. A parallel can be drawn between the Event bus and the Return bus in that the Return bus holds the return IP information from a Return type instruction and the Event bus holds the return IP information resulting from a process switching. The example in FIG. 8 illustrates the mechanism to generate the Event bus address. Referring to Reference point in the above example, and assuming that there is a process switching for the next cycle, the logic needs to ask the following questions before deciding which source of IP should be chosen for the next cycle:

Is the next process id the same as the process in pipe 2?

Is the next process id the same as the process in pipe 1?

Is pipe 1 a call or a return instruction?

Is pipe 2 a call or a return instruction?

Is there an event switch in the beginning of pipe 1?

Based on the above information, the pipe sequencer chooses an IP from one of the 6 Write Back Paths data as in the case of the return bus address. Finally, the Event Bus is the interface between the ECU, AFU and the PS. New event IP requested by hardware and software, generated by the event control unit (ECU-1-4) or the AFU as in the cases of Assist or Event Debug is received by the Event Bus before entering into the UA address Mux (80).

Write Back 1 and 2 paths.

Figure 14:
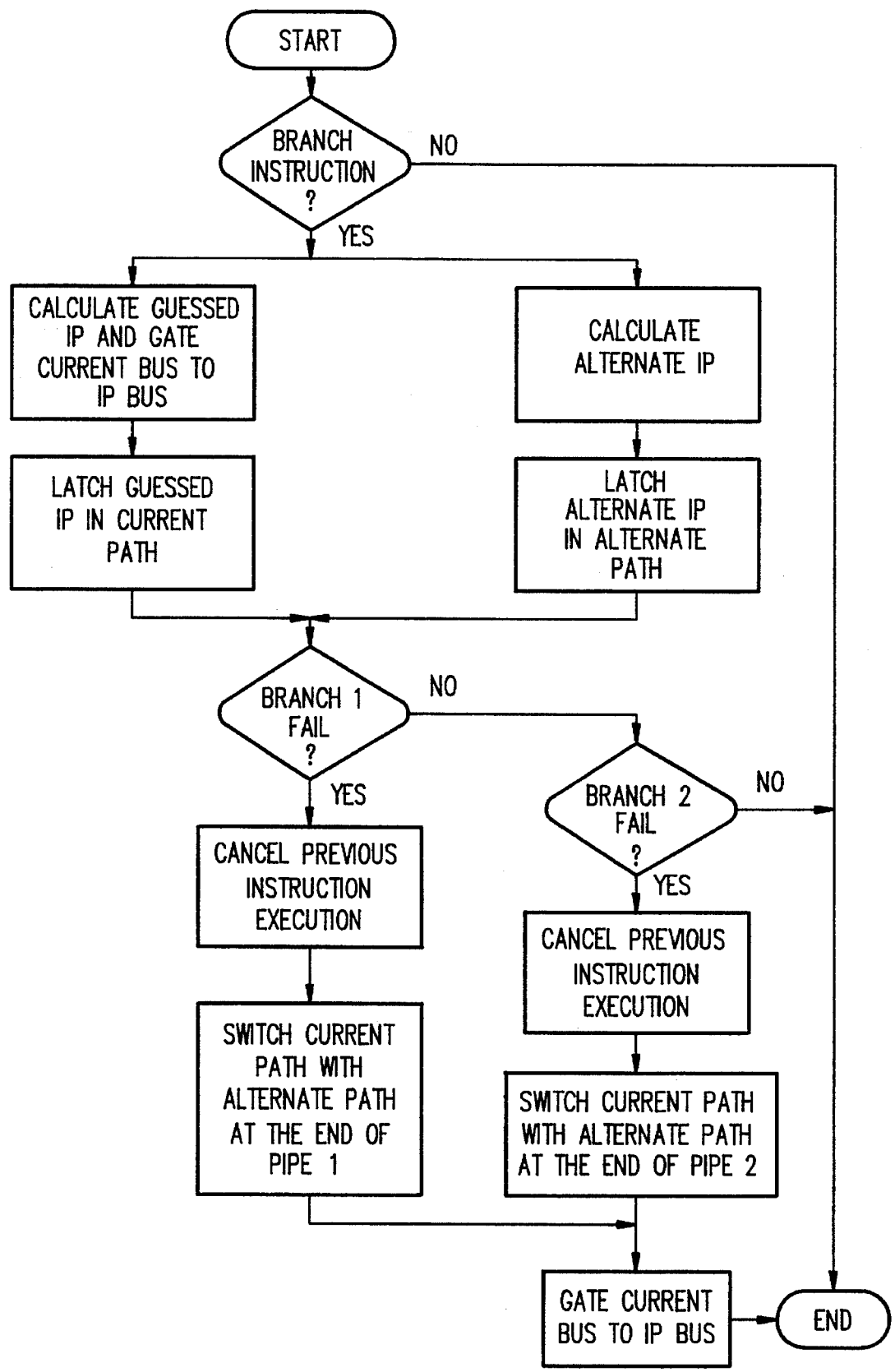
FIG. 14 is a flow chart of the pipe sequencer operation during the decoding of a branch instruction which illustrates how the new instruction pointer is generated in the case of a branch guess failure; and, FIG. 15A and 15B are flow charts of the write back path.

Refer to FIG. 14 which is a flow chart of the pipe sequencer operation during the decoding of a branch instruction which illustrates how the new instruction pointer is generated in the case of a branch guess failure. To improve performance, the pipe sequencer always tries to overlap the calculation of the branch target with the execution of another instruction. Aided by the Branch Lookahead mechanism (98), the pipe sequencer identifies in a 3 to 4 words window a Next New Branch. Thus, When the time comes to issue that branch the Condition Codes are not yet ready for the pipe sequencer and the pipe sequencer has to guess the outcome of the Condition Codes. At the time of the guess, the pipe sequencer pushes into the Write Back Path, not only the Current IP information but also the Alternate IP data which contains the IP to be rebranched to if the guess was wrong. In the later case, the Current path and the Alternate path get switched and the result will flow out to the Microaddress Mux (80). Write Back I will be chosen when Branch fail 1 happens and Write Back 2 when branch fail 2 happens, as described subsequently.

Recirculate IP

The latest IP is recirculated when the machine is scoreboarded and there is no context switching (like Assist, DMA). This IP is one of the sources of the UA address like all the above described sources.

Micro Address Write Back Path Control

The pipe sequencer write back path is served to store snap shots of the state of the machine in pipe 1 and 2. This is needed because the branch guessing and the process switching features of the system require a way to correct itself after issuing a wrong IP (in the case of the branch guessing), or a way to simply preserve the internal state of the machine at the time a context switching occurs in order to come back to the same condition it had left.

FIG. 2 shows how the information from the q11 instructions is loaded onto the Write Back Path. The Write Back Path is composed of 3 separate paths into the WRBACK 1 and WRBACK 2 logic blocks (88, 90): Current (130, 131), Alternate (134, 135), and Opcode paths (108, 109) and 4 outward busses Return (116), Event bus (106), branch fail 1 and branch fail 2 bus. The three inward paths can be considered as snap shots of the pipe in each pipe of the machine.

Figure 15A:
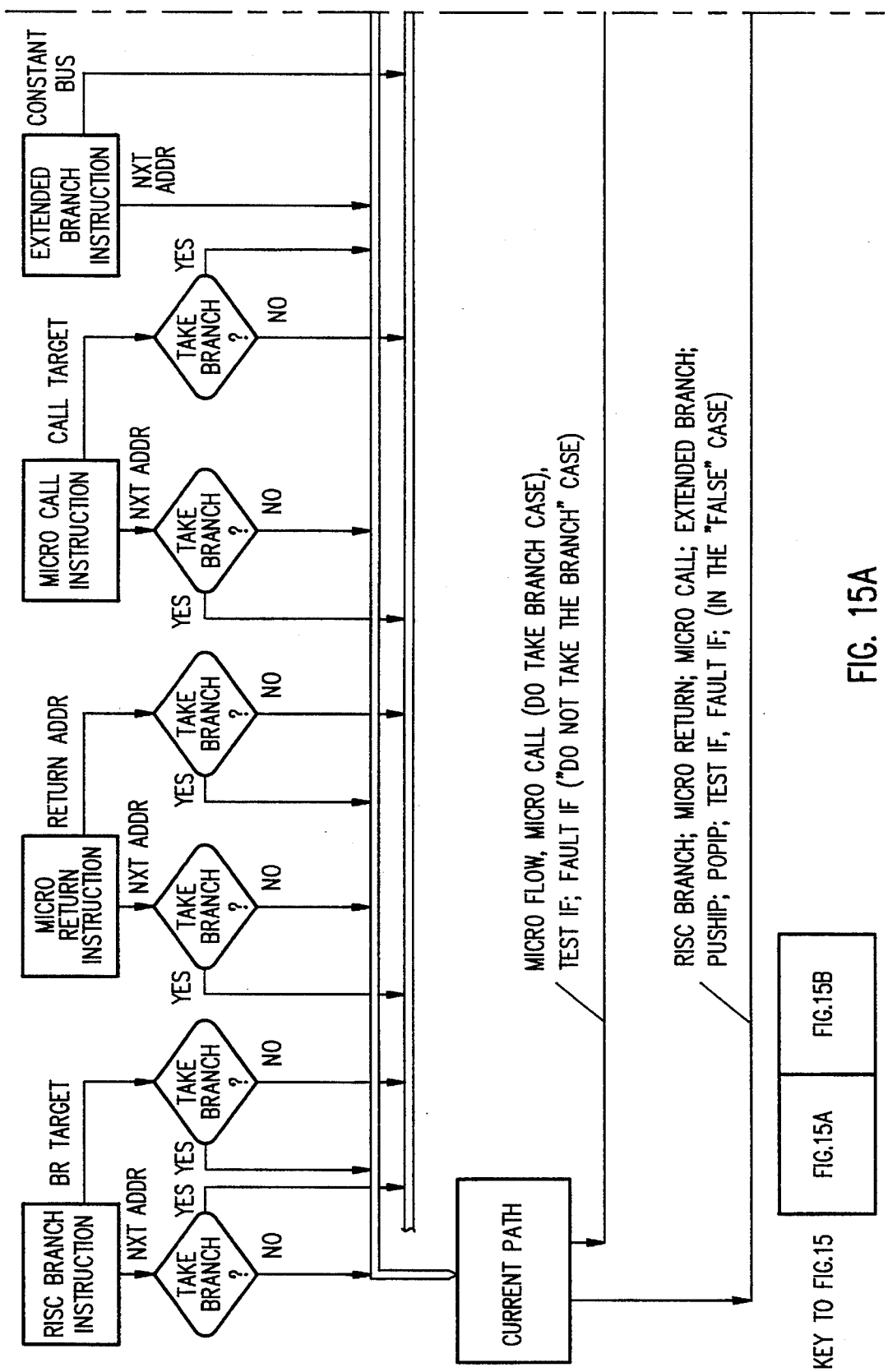
Figure 15B:
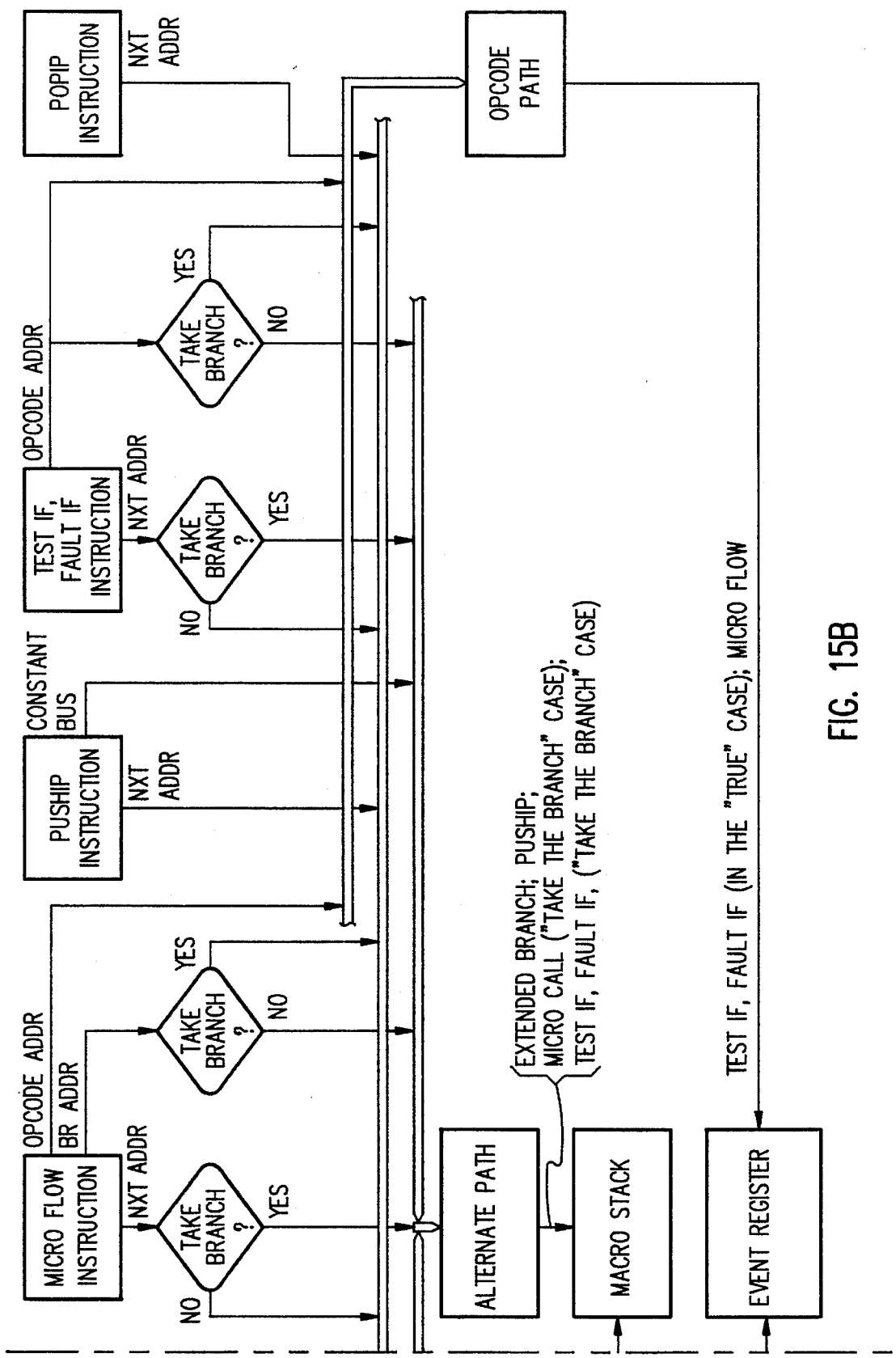

A flow chart of the write back path is shown in FIG. 15. In pipe 1, the pipe sequencer categorizes the branch type aspect of the instruction based on the machine bus data. Instructions are divided into 8 categories: (1) RISC Branch (Conditional Branch), (2) Micro Return (Conditional Return), (3) Micro Call (Conditional call), (4) Extended branch, (5) Macro flow, (6) Puship, (7) Test if, Fault if (Conditional call macro flow), (8) popip. All instructions which are non-branch RISC type or unconditional branch are considered as Conditional branch instructions. The Call/Return instructions and all micro flow instructions are considered as macro flow instructions. Test if, Fault if are the only Conditional macro flow instructions.

FIG. 9 shows the Write Back Path snap shot in q12 depending on 2 parameters: brcomq11 and oldflgq11. Brcomq11 is the branch type aspect of the instruction explained previously, and Oldflgq11 is the branch guessing parameter chosen by the pipe sequencer in the conditional branch instruction case. Oldflgq11 is asserted when the pipe sequencer took the branch and is not asserted when it forced through.

Refer to FIG. 14 which is a flow chart of the pipe sequencer operation during the decoding of a branch instruction. FIG. 14 illustrates how the new instruction pointer is generated in the case of a branch guess failure. The Current Path stores the next IP chosen by the PS. It doesn't mean that the next issued IP is the same as in the Current Path due to the fact that a process switch or an Assist may happen and will take priority over the one in the Current Path. The term "next" means the next instruction of the same program sequence. The stored IP in the Current Path is, most of the time, the next instruction address or the branch target address depending on Oldflgq11. There are 2 exceptions however: Conditional return and Conditional Macro flow. In these 2 cases, the target address of the conditional branch does not come from the Branch look ahead but from the return bus of the Write Back Path and the opcocde translate bus from the Translate Rom (100).

The Alternate Path stores the Alternate Guessing route. Consequently, in most of the cases, it is opposite to the Current Path by the state of Oldflgq11. There are 2 exceptions: Delayed Branch and Puship. In these 2 cases, there is no guessing involved and the Alternate Path is used to receive the pushed IP. From FIG. 6, the Alternate Path will be switched at the end of pipe 1 with the Current Path if Branch Fail 1 occurs or at the end of pipe 2 if Branch Fail 2 happens.

The Opcode Path is used to receive the Translated Opcode IP from the Translate Rom in the case of a micro flow instruction. The Translated IP points to the starting address of the subroutine of the micro flow instruction in the Urom (see Ser. No. 07/630,498). In FIG. 6 there are only two categories which really use the Opcode Path: macro flow and Conditional macro flow. Due to the fact that the Opcode Path is only used at the boundary of Macro and Micro environment, it is very convenient to use the same path to receive the first micro handler of the Interrupt and the Fault routines. The pipe sequencer handles Interrupt and Fault almost the same way it handles Call/Return or any microflow instructions. In the case of Interrupts, the pipe sequencer makes the next instruction a micro-flow instruction with interrupt micro code as the micro subroutine if the next instruction is a RISC instruction. In the case the next instruction is a micro flow instruction, the pipe sequencer will erase the translate ready state of that instruction and sneak in the Interrupt routine at the Look a head time slot (which is a No op RISC instruction). In the case of Fault, the pipe sequencer makes the next instruction become a No op micro flow instruction with the Fault micro code as the micro subroutine.

Figure 12:
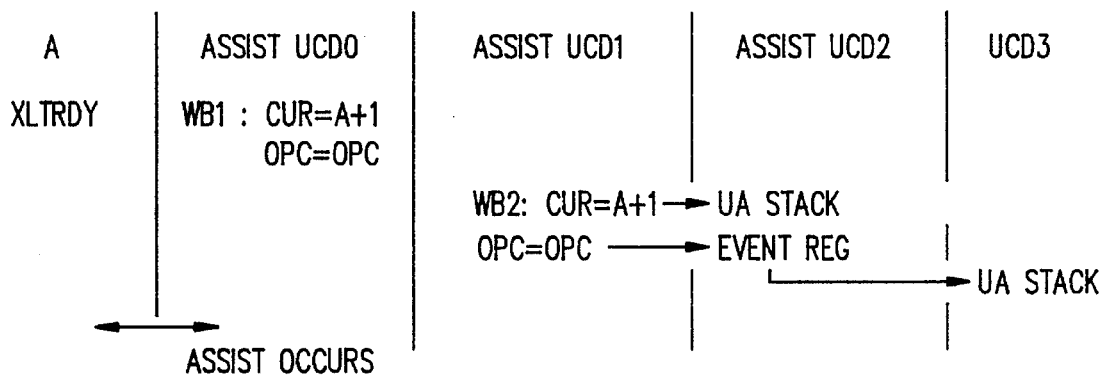
FIG. 12 is an example of a complex stack updating, composed of an Assist at the same time a macro-flow instruction is issued.
Figure 10:
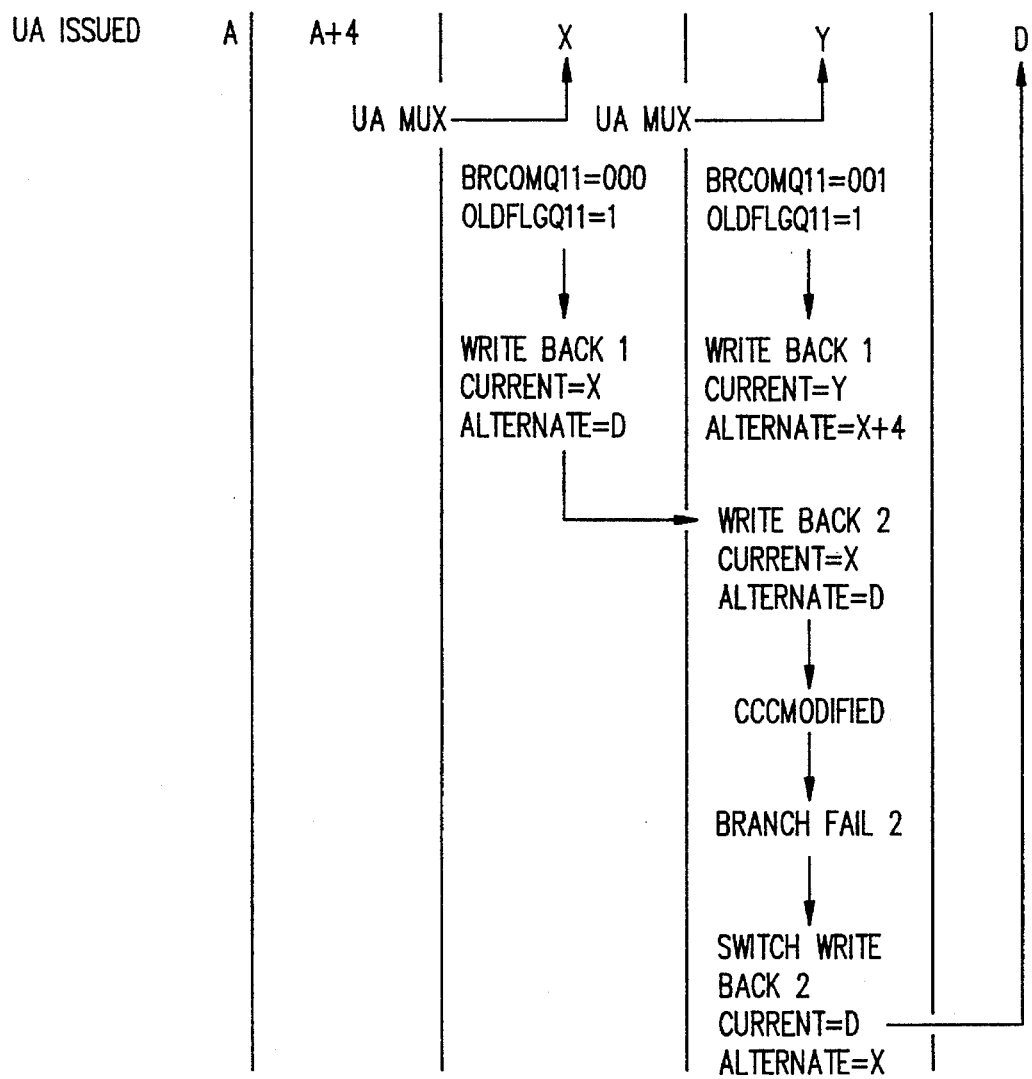
FIG. 10 depicts how the pipe sequencer analyses information to put into the Write Back Path when there is a conditional branch with ucall and branch fail 2.

To illustrate the Write Back Path, FIG. 12 depicts how the pipe sequencer analyses information to put into the Write Back Path when there is a conditional branch with ucall and branch fail 2.

The inward data will end up in two registers: the Event Register (92) or the UA stack (86). The Event Register is updated in the beginning of pipe 3, with the real next instruction of the instruction issued three pipes ago. Note the emphasis on the term real next versus simply next. This is because in the non-RISC instructions, the real next instruction is the Ucode instruction which the IP was provided by the Translate Rom. The next instruction on the other hand is the next Macro instruction in the program sequence. Thus, as shown in FIG. 2, the Event Register data source, in a RISC case, comes from the Current Path and in the Micro flow case from the Opcode Path. To support multi-processing, 6 Event Registers are implemented: 4 DMA registers, each 2 deep, and 2 USER registers, 4 deep.

The UA stack is updated when there is a call type of instruction, in the beginning of pipe 3. Because there are 2 pipes before the data gets to the UA stack, a return type of instruction requiring the stack information during this period of time is served, not from the UA stack but by the Write Back Path itself. FIG. 6 shows the source of the UA stack when there is no assist present. An assist requires its own return address on top of the macro Return IP. The RIP of the assist will always come from the Event Register. Thus, in this case, the contents of the Event Register are loaded into the UA stack. The UA stack pointer is discussed subsequently.

The Write Back Path discussed above with respect to FIG. 2 is for the smooth ride cases. A dilemma arises when an instruction gets score-boarded (in pipe 1) and a new process gets issued in the same clock. It is desirable to execute the first instruction of the new process as soon as possible in order to unscore board the machine. At the same time it is desirable to have the machine resolve the cause of the score board situation itself. It is not possible to do both, therefor the logic drops the score boarded instruction, changes the Write Back Path to its state before the score boarding happened and forces the new process instruction onto the machine bus for execution. This action is called the feed forward mechanism in the PS.

Micro-address (UA) Stack Pointer Control

The core pipelining scheme differs from the conventional machine in that there are two buffered cycles inside the Write Back Path which will flow toward the UA stack in Q31. These two cycles are called bypassed cycles. This name emphasizes the fact that in these two cycles the return IP actually bypasses the UA stack and is put into the return bus by the Write Back Path itself. Thus, during these two cycles, the pipe sequencer does not need the Stack Pointer for the return IP.

UA stack pointer register

To keep track of the UA stack pointer the pipe sequencer has one UA stack pointer register per process. It updates this register in Q31. At that point the instruction is completed. Thus, the updating of the UA stack pointer register is always correct. The pipe sequencer increments the UA stack pointer register by one when the Q22 instruction is a conditional call (like Ucall on flag), or a delayed Branch (like puship), or any macro-flow instruction. In addition, an event switching will also cause the register to be bumped up by one. It decrements the pointer by one if the Q22 instruction is a conditional return or a popip type instruction.

Figure 11:
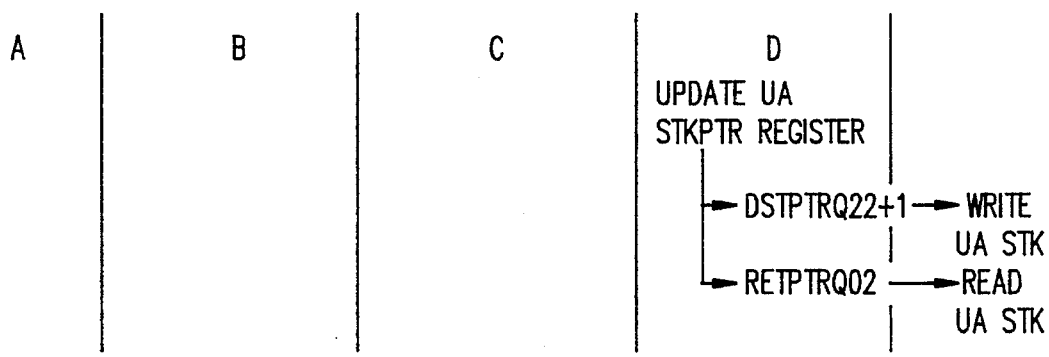
FIG. 11 is a timing diagram of the UA stack pointer control timing.

Refer to FIG. 11 which is a timing diagram of the UA stack pointer control timing. The pipe sequencer updates the UA pointer register in Q31 it writes the IP into the UA stack in Q22 (dstptrq22) and reads out the IP from the UA stack during Q02 (retptrq02). In other words, the UA stack pointer register gets updated from instruction A, generates dstptrq22 (the UA stack write port pointer) for instruction B (if B is a push/call type instruction) and provides retptrq02 (the UA stack read port pointer) for instruction D (if D is a pop/return type instruction). In the Destination pointer case, the machine reads out the UA stack register, in Q22, adds one and uses that result to access the UA stack. This simplicity derives from the fact that Q22 is the next cycle of Q31 and there is no intermediate instruction issued between the time the stack pointer register gets updated and used to generate the destination address. In the return pointer case, more considerations are needed since there is a bypass zone between Q31 and Q02 instructions. In each cycle, at ph2, The pipe sequencer guesses the return pointer of the UA stack by looking at the instruction type, scoreboard signal and branch fail signal in both pipe 1 and 2. The term guess is used to emphasize the fact that the pipe sequencer does not know, at that time, the referred instruction completes successfully or not. Therefore, in some instances, the guess can be wrong. However in these cases the pipe sequencer guaranties that the return data is not coming from the UA stack.

An example of a complex stack updating, composed of an Assist at the same time a macro-flow instruction is issued is shown in FIG. 12.

In this example, A is the macro-flow instruction, and at Q31 of A the pipe sequencer stores the Current data of the Write Back into the UA stack and, at the same instance, saves the Opcode data in the Event Register. In the next cycle, the Assist causes the pipe sequencer to push the stored data in the Event Register into the UA stack in Q41 of A. This action is needed because the Opcode IP is the return address after the completion of the event. This action, obviously, causes a limitation to system micro architecture: No puship instruction is allowed in the first cycle of an Assist Ucode because at Q31 of that instruction the 2 updating sources between the IP pushed by the Assist and the Event Register data will collide. UCall instruction is allowed in the first instruction of an Assist because it needs one more cycle to calculate the target of the branch before executing the instruction itself.

Macro Flow Instruction control

The Instruction Set has many complex instructions which require too much hardware to implement in one clock. At the same time many of these instructions happen frequently enough that losing a clock to branch into microcode would have a major impact on performance. Memory Addressing modes such as Base+ Displacement or Call and Return instructions are examples of frequent operations that are not supported by a 1 state RISC instruction.

The conventional strategy to include Microcode redirection in the pipe would extend the pipe from 3 cycles to 4 cycles. This was considered a poor trade off considering the machine has been optimized to branch quickly. The average conditional branch time for good code is about 1 clock now and it would go to about 2 if an extra pipe stage is added.

The present invention takes advantage of the parallel execution hardware (4 word wide instruction bus) to lookahead for macro flow instructions and to translate them ahead of time before they were actually executed.

Translation will always take place ahead every macro flow instruction independent of placement in the instruction stream unless the program branches directly to a macro flow. In this case a 1 clock hit will be seen. No other hit will be seen as long as the program progresses sequentially. This is true for back to back macro flow instructions and instructions of any type (memory, register, or branch).

One can usually insert a RISC register instruction or any memory instruction at the beginning of every redirection. That way the translate state will always be transparent.

Macro Flow Detection

Detection of a Macro Flow instruction is complicated by the fact that they exist all over the Opcode bit map. This prohibits easy decode of this important information. To solve the problem logic is provided to decode the Micro Flow detection before it enters the Instruction Cache.

The signals uflow0q02 - uflow3q02 indicate if words 0 to 3 of the Instruction bus are macro flow instructions. This information is used in q02.

be 0 to 4, the next instruction could be in none or any word. Also, the first instruction could be a microflow instruction that is or is not already translated.

The nxtxltq11 signal propagates through to the output state of the next instruction so the next instruction xltrdy state bit will not be valid until near the end of q01.

Translation ROM

Micro Flow instructions must execute their first cycle of instructions out of a translation ROM (XROM) attached to the Mouse Trap. This mechanism helps out several things.

By reading the First cycle from the XROM a speed path is eliminated which would have required passing the Opcode in q11 from any of the 4 instruction bus words to the UA Bus.

Also, if redirection into the micro ROM was done in the first cycle (instead of the XROM) then there would be no time to lookahead beyond the current macro flow instruction for any macro flow instructions after the current one. This would mean back-to-back micro flow instructions would always loose a clock between them. This is too costly.

The UA always points to the macro flow instruction during the first cycle so that the remaining words on the Instruction bus are scanned for future macro flows.

Alias Register selection

Two Alias Registers must exist for each process, one to be used in a micro flow currently executing and the second to be loaded in the first cycle of the current macro flow (see Ser. No. 07/630,497). To determine which register to use, a bit is kept as part of the machine state (XLTBLK) to point to the correct block.

Special Branch Instructions

Some Branch instructions are micro flows. Call, Return, All compare and branch, Test, and Fault instructions are all Branching micro flows. TABLE IV lists some useful characteristics of these branch instructions.

TABLE IV

| Branch | Flag | Uflow | Cycles | UA | CurAdr | AltAdr | Opc |
|---|---|---|---|---|---|---|---|
| RISC Branch | true | no | — | bradr | bradr | nxtadr | — |
|  | false |  |  | nxtadr | nxtadr | bradr | — |
| CompBr | true | yes | 1 | bradr | bradr | nxtadr | — |
|  | false |  |  | nxtadr | nxtadr | bradr | — |
| Br_link | true | yes | 1 | bradr | bradr | nxtadr | — |
| Call | true | yes | >1 | opcode | bradr | x | opc |
| Test/fault | true | yes | 1–2 | nxtadr | nxtadr | opcode | opc |
|  | false |  |  | opcode | opcode | nxtadr |  |
| Uflow Reg. | — | yes | >1 | opcode | x | x | opc |
| Uflow | true | yes | >1 | opcode | bradr | nxtadr | opc |
| Reg. + BR | false |  |  | opcode | nxtadr | bradr |  |

Translation Lookahead

One of the most powerful detection efforts in the pipe sequencer is done by the NXTXLTQ11- next translate ready q11 signal. This is the signal which determines if the next instruction will be a macro flow instruction. It must be able to look at all 4 words coming from the cache in q11 and figure out what instructions will execute this state so that it can locate the first next instruction.

Since the number of words used in the current state could

The columns entitled UA, Curadr, AltAdr and Opcxlt are UA paths in the Pipe Sequencer described in the section on UA Write Back Control.

The machine has a format dependent decoding to distinguish between micro flow branches.

Memory Format Micro Flows

Memory format instructions have a special advantage over other micro flow instructions. A memory format macro flow instruction will never lose a cycle due to the lookahead like the register or branch format macro flows. A micro flow memory operation such as ldq offset(base), reg requires 2 clocks to complete and does not need a 1 cycle lookahead because the operation that is always performed in the first cycle of a memory operation is a lda.

The lookahead has time to recognize that the next macro flow instruction is a memory operation and change the q11 version of the ldstout machine bus control signal to be a lda independent of what it really is. It also has time to drive a scratch register address for the destination of the lda to place the effective address in.

The first cycle of any macro flow memory operation can thus be implied immediately without having to go through the translate ROM. The second cycle of a macro flow memory operation will then go into the translate ROM and the xltrdy state bit will be set accordingly.

Interface Signal Description

The pipe sequencer communicates extensively with the Instruction Queue, the Branch lookahead and Instruction Decode modules. They are physically located above and below the pipe sequencer. The pipe sequencer also drives the ICE interface which includes the IP path for storing IPs of instructions taking longer than the core pipe to complete and the Event Interface which is used to change processes and drive events into the core. Below is the list of signals going between the pipe sequencer and the other units:

| Signal | Units |
|---|---|
| CPUDATACQ11 | #RF #MUL #ID #PS #ICE |
| BRTYPEQ02 | #ID #PS #BLA |
| BRADDRQ02 | #PS #BLA |
| FIAGSQ21 | #EU #AGU #PS #BLA #SR #AFU #ICE #DMA |
| #INTER | |
| NIFQN1 | #MUL #ID #PS #AFU |
| EVENTQN2 | #PS #AFU #EVECON |
| BRBYPQ01 | #ID #PS #BLA |
| EVSUBRTQN2 | #ID #PS #AFU #EVECON |
| RDIPQ11 | #PS #AFU |
| BRFAIL2 | #PS #BLA |
| CUCALLQ02 | #ID #PS |
| RTOOSOONQ11 | #ID #PS |
| SELMEM1U11 | #IFU #ID #PS #AFU |
| UADDRQ01 | #IFU #ID #PS #BLA #STATS #MACSIM #AFU |
| SELNXTU11 | #IFU #PS |
| EOMQ02 | #ID #PS #AFU #EVECON |
| UADDRQ02 | #PS #BLA #ICE |
| ICEMACMDQ11 | #PS #AFU #ICE |
| UADDRQ11 | #PS #BLA |
| BOPRDYQ01 | #IFU #PS #BLA |
| CRLPH1U11 | #IFU #PS #BLA |
| EVCACHQN2 | #PS #AFU #EVECON |
| BOPRDYQ02 | #PS #BLA |
| CCEUIDQ22 | #EU #PS #STATS #MACSIM #AFU |
| CCEUIDU22 | #EU #PS |
| CCEUTDIU22 | #EU #PS |
| PROCQ11 | #AGU #PS #BLA #SR #ICE #BCD #DMA |
| PROCQN2 | #ID #PS #AFU #EVECON |
| PROC01EQ | #PS #AFU |
| PROC12EQ | #PS #BLA #AFU |
| PROCQ01 | #PS #BLA |
| PROCX0EQ | #PS #EVECON |
| CCBYPASS | #EU #PS #AFU |
| FRCFREZQ11 | #IFU #PS |
| ADD0U11 | #IFU #PS |
| VALRSTU11 | #IFU #PS |
| EFAULTUN2 | #AGU #PS |
| FRZCCQ11 | #ID #PS |
| WAITQ01 | #PS #EVECON |
| CANPIPQ11 | #IFU #ID #PS |
| CDEBUGQ01 | #IFU #PS |
| SELREG0U11 | #IFU #ID #PS |
| UFLOW0Q02 | #IFU #PS #BLA #STATS #MACSIM |
| EXTENDBR | #IFU #AGU #ID #PS #BLA |
| ADD12U11 | #IFU #PS |
| CDEBUGQ02 | #ID #PS #BLA |
| EOMACKQ21 | #PS #AFU |
| XLTRDYQ02 | #PS #BLA |
| MACRO0 | #IFU #ID #PS #BLA #STATS #MACSIM |
| CACHEBITS | #ID #PS #BLA |
| PARTICQN1 | #PS #BLA #AFU |
| ICERSCBRQ11 | #PS #AFU #ICE |
| CNSTBUSU12 | #AGU #ID #PS #BLA |
| CANREGQ11 | #ID #PS #AFU #EVECON #ICE |
| EVEXTQN2 | #PS #AFU #EVECON |
| ICESLRG0Q11 | #PS #ICE |

-continued

| | |
|---|---|
| POPIPQ11 | #PS #AFU |
| ICETRAPQ11 | #RF #AGU #PS #MEM #SR #BCD |
| MACTAG | #IFU #PS #BLA #STATS #MACSIM |
| ADD4U11 | #IFU #PS |
| UCALLQ02 | #ID #PS |
| MODE0ICQN2 | #PS #AFU |
| MODE1ICQN2 | #PS #AFU |
| VALBOPQ02 | #PS #BLA |
| MODFLG0Q02 | #IFU #PS #BLA |
| BRFLAGQ02 | #ID #PS |
| FLGMUXQ02 | #ID #PS #BLA |
| OPCXLTQ02 | #ID #PS |
| CCIDEUQ12 | #EU #PS #STATS #MACSIM #AFU |
| NXTUADQ01 | #IFU #PS |
| SELCURU11 | #IFU #PS |
| ICEBRFL1Q12 | #IID #PS #AFU #ICE |
| ICEBRFL2Q22 | #ID #PS #AFU #ICE |
| PCUSRMODQN2 | #ID #PS |
| ICEBREXTQ11 | #PS #AFU #ICE |
| NXTUADQ02 | #PS #BLA #ICE |
| ICEBRSTBQ11 | #PS #AFU #ICE |
| ICEBRTRQ11 | #PS #AFU #ICE |
| CARRY4Q02 | #IFU #PS |
| CARRY8Q02 | #IFU #PS |
| CARRY12Q02 | #IFU #PS |
| NXTBOPU11 | #ID #PS #BLA |
| EVALIDQN2 | #PS #AFU #EVECON |
| ICEWRDEXQ11 | #PS #AFU #ICE |
| RETQCKQ01 | #PS #BLA |
| USTATEQ01 | #IFU #AGU #ID #PS #BLA #STATS #MACSIM #AFU #EVECON |
| ADD8U11 | #IFU #PS |
| EVMACQN2 | #PS #AFU #EVECON |
| UCPATCHQ02 | #PS #AFU |
| SYNCEOMQ11 | #PS #AFU #EVECON |
| BRTAKEQ02 | #PS #BLA |
| USTATEQ02 | #PS #BLA |
| CPBUSYU21 | #MUL #PS #SYSCALL #MEM |
| NXTXLTU11 | #ID #PS #BLA |
| RESTARTQ12 | #ID #PS |
| INTSTAQN1 | #PS #AFU |
| ENABICQN1 | #PS #BLA #AFU |
| XLTFLTIPQ11 | #PS #AFU #ICE |
| RETSTAQ11 | #PS #AFU |
| FRCPIPQ02 | #IFU #AGU #ID #PS #BLA #STATS #MACSIM #AFU #EVECON #ICE |
| FRCPIPQ11 | #PS #MEM |
| SFEMPW | #ID #PS #SR |

While the invention has been particularly shown and described with reference to preferred embodiments thereof, it will be understood by those skilled in the art that the foregoing and other changes in form and detail may be made therein without departing from the scope of the invention.

What is claimed is:

1. In a pipelined microprocessor comprised of a first microinstruction address stack, a second microinstruction address stack, and a number of pipe stages, in which pipelined microinstructions are executed, a method comprising steps of:

(A) providing first state bits, said first state bits comprising all hidden states necessary to execute first microinstructions pointed to by a microinstruction address of a first program;

(B) executing said first microinstructions of said first program;

(C) providing second state bits, said second state bits comprising all hidden states necessary to execute second microinstructions pointed to by a microinstruction address of a second program;

(D) executing said second microinstructions of second program, said second microinstructions of said second program being executed concurrently with execution of said first microinstructions of said first program;

(E) maintaining a representation of said first state bits in each of said number of pipe stages and in said first microinstruction address stack;

(F) moving a first representation of said first state bits from one of said number of pipe stages to a next one of said number of pipe stages until said first microinstructions have completed execution or until said first representation of said first state bits reaches and is stored on said first micro address stack;

(G) maintaining said first representation of said first state bits in an unchanged state on said first micro address stack while waiting for said first microinstructions to be executed;

(H) substituting a second representation of said first state bits for said first representation of said first state bits on said micro address stack upon a condition that said first microinstructions have completed;

(I) maintaining a representation of said second state bits in each of said number of pipe stages and in said second microinstruction address stack;

(J) moving a first representation of said second state bits from one of said number of pipe stages to a next one of said number of pipe stages until said second microinstructions have completed execution or until said first representation of said second state bits reaches and is stored on said second micro address stack;

(K) maintaining said second representation of said second state bits in an unchanged state on said second micro address stack while waiting for said second microinstructions to be executed; and, (L) substituting a second representation of said second state bits for said first representation of said second state bits on said second micro address stack upon a condition that said second microinstructions have completed execution.

2. In a pipelined microprocessor including an execution unit for executing instructions pointed to by a microinstruction address (UA) supplied over a microaddress bus, a pipe sequencer comprising:

a return bus connected to said microaddress bus;

a number of microaddress stacks;

first write back means for storing a pipe 1 state;

second write back means for storing a pipe 2 state;

first return path means connected to said return bus, to said first write back means, to said second write back means logic and to said number of microaddress stacks;

said first return path means being responsive a return type instruction at said first write back means or said second write back means for gating to said return bus, an address selected from one of said first write back means, said second write back means or said microaddress stacks.

3. The pipe sequencer in accordance with claim 2 further comprising:

an event bus connected to said microaddress bus;

event control means;

event storage means for storing said pipe 2 state received from said second write back means;

second return path means connected to said event bus, to said event storage means, to said first write back means, to said second write back means and to said event control means;

said second return path means including means responsive to an event condition at said event control means for gating to said event bus, an address selected from one of said first write back means, said second write back means or said event storage means.

4. The pipe sequencer in accordance with claim 2 wherein:

said pipe 1 state includes first state bits comprising all hidden states necessary to execute first microinstructions; and, said pipe 2 state includes second state bits comprising all hidden states necessary to execute second microinstructions.

5. The pipe sequencer in accordance with claim 4 wherein:

said pipe 1 state includes first state bits comprising all hidden states necessary to execute first microinstructions pointed to by a microinstruction address of a first program; and, said pipe 2 state includes second state bits comprising all hidden states necessary to execute second microinstructions pointed to by a microinstruction address of a second program.

6. In a pipelined microprocessor including an execution unit for executing instructions pointed to by a microinstruction address (UA) supplied over a microaddress bus, a pipe sequencer comprising:

a return bus interfacing with said microaddress bus;

a number of microaddress stacks;

a write back 1 (WRBACK 1) logic storing a pipe 1 state;

a write back 2 (WRBACK 2) logic storing a pipe 2 state;

a return path 1 (RETPTH 1) logic connected to said return bus, to said WRBACK 1 logic, to said WRBACK 2 logic and to said number of microaddress stacks;

said return path 1 (RETPTH 1) logic being responsive a return type instruction at said WRBACK 1 logic or said WRBACK 2 logic for gating to said return bus, an address selected from one of said WRBACK 1 logic, said WRBACK 2 logic or said microaddress stacks.

7. The pipe sequencer in accordance with claim 6 wherein:

said pipe 1 state includes first state bits comprising all hidden states necessary to execute first microinstructions; and, said pipe 2 state includes second state bits comprising all hidden states necessary to execute second microinstructions.

8. The pipe sequencer in accordance with claim 7 wherein:

said pipe 1 state includes first state bits comprising all hidden states necessary to execute first microinstructions pointed to by a microinstruction address of a first program; and, said pipe 2 state includes second state bits comprising all hidden states necessary to execute second microinstructions pointed to by a microinstruction address of a second program.

9. The pipe sequencer in accordance with claim 6 further comprising:

an event bus interfacing with said microaddress bus;

an event control unit;

a number of event registers connected to said WRBACK 2 logic;

said event registers storing said pipe 2 state received from said WRBACK 2 logic;

a return path 2 (RETPTH 2) logic connected to said event bus, to said event registers, to said WRBACK 1 logic, to said WRBACK 2 logic and to said event control unit;

said return path 2 (RETPTH 2)logic being responsive to an event condition at said event control unit for gating to said event bus, an address selected from one of said WRBACK 1 logic, said WRBACK 2 logic or said event registers.

* * * * *

UNITED STATES PATENT AND TRADEMARK OFFICE
CERTIFICATE OF CORRECTION

PATENT NO.   : 5,459,845
DATED        : October 17, 1995
INVENTOR(S)  : Nguyen, et al.

It is certified that error appears in the above-indentified patent and that said Letters Patent is hereby corrected as shown below:

Column 6, line 36, change "digest" to --direct--.
Column 12, line 54, change "phi" to --phl--.

Signed and Sealed this

Twenty-first Day of May, 1996

Attest:

BRUCE LEHMAN

Attesting Officer        Commissioner of Patents and Trademarks